(12) United States Patent
Kamiwada et al.

(10) Patent No.: US 8,489,629 B2
(45) Date of Patent: Jul. 16, 2013

(54) COMMUNICATION TERMINAL DEVICE, COMPUTER PROGRAM, AND CONTENT SEARCH METHOD

(75) Inventors: Toru Kamiwada, Kawasaki (JP); Hironori Sakakihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 13/050,212

(22) Filed: Mar. 17, 2011

(65) Prior Publication Data

US 2011/0231431 A1   Sep. 22, 2011

(30) Foreign Application Priority Data

Mar. 19, 2010  (JP) .................................. 2010-64018

(51) Int. Cl.
*G06F 17/30* (2006.01)

(52) U.S. Cl.
USPC .......................................... 707/769; 707/793

(58) Field of Classification Search
USPC ......................................................... 707/769
See application file for complete search history.

(56) References Cited

U.S. PATENT DOCUMENTS

| | | | | |
|---|---|---|---|---|
| 8,180,688 B1 * | 5/2012 | Velummylum et al. | ..... | 705/26.7 |
| 8,234,307 B1 * | 7/2012 | Shure et al. | ................... | 707/793 |
| 2004/0002945 A1 * | 1/2004 | Shibata | ............................. | 707/1 |
| 2005/0162523 A1 * | 7/2005 | Darrell et al. | ............... | 348/211.2 |
| 2005/0203883 A1 * | 9/2005 | Farrett | ................................ | 707/3 |
| 2006/0155747 A1 * | 7/2006 | Olivieri et al. | ................ | 707/102 |
| 2007/0043706 A1 * | 2/2007 | Burke et al. | ........................ | 707/3 |
| 2007/0226183 A1 * | 9/2007 | Hart et al. | .......................... | 707/3 |
| 2008/0134248 A1 | 6/2008 | Matsuda et al. | | |
| 2008/0172445 A1 * | 7/2008 | Zaidelson et al. | ............ | 709/201 |
| 2009/0031385 A1 * | 1/2009 | Karnalkar et al. | ............. | 725/131 |
| 2010/0153427 A1 * | 6/2010 | Schechter et al. | ............ | 707/768 |

FOREIGN PATENT DOCUMENTS

| | | |
|---|---|---|
| JP | 7-334516 | 12/1995 |
| JP | 2008-141416 | 6/2008 |
| JP | 4182743 | 9/2008 |

* cited by examiner

*Primary Examiner* — Binh V Ho

(74) *Attorney, Agent, or Firm* — Fujitsu Patent Center

(57) ABSTRACT

A communication terminal device includes: a communication unit configured to connect to a network to transmit and receive contents among a plurality of nodes; a memory configured to accumulate a history table that stores a search history of a content search; and a processor configured to execute a process comprising: storing the search history of the content search in the history table; comparing metadata attached to a search object content that is a content search object with metadata attached to a content stored in the history table; determining whether the content stored in the history table is similar to the search object content based on the comparing of the metadata; and making the transmission unit transmit information inquiring about possession of the search object content to a node that possesses a content determined to be similar to the search object content.

7 Claims, 14 Drawing Sheets

FIG. 3

| ACQUIRED CONTENT | ID | TITLE | DETAILED INFORMATION | SERIES ID |
|---|---|---|---|---|
| CONTENT 1 | 0001 | HK SPECIAL... | | 0533 |
| CONTENT 2 | 0212 | DRAMA SERIES... | | |
| CONTENT 3 | 0647 | NEWS... | | |
| CONTENT 4 | 3811 | HK SPECIAL... | | 0533 |
| ⋮ | ⋮ | ⋮ | | |

| ACQUIRED CONTENT | ACQUISITION SOURCE NODEID | POSSESSION RESPONSE NODES |
|---|---|---|
| CONTENT 1 | NODE B | NODES B, C, D |
| CONTENT 2 | NODE C | NODES C, D, E, F, G |
| CONTENT 3 | NODE B | NODES B, C, D |
| CONTENT 4 | NODE F | NODES B, C, D |
| ⋮ | ⋮ | ⋮ |

| ITEM NAME | DATA (EXAMPLE) |
|---|---|
| SEARCH QUERY ID | 0004 |
| CONTENT ID OF DESIRED CONTENT | 0212 |
| NODE ID OF SEARCH TRANSMISSION SOURCE NODE | NODE A |
| SIMILARITY SEARCH FLAG | YES |

FIG. 6

| ITEM NAME | DATA (EXAMPLE) | |
|---|---|---|
| | WHEN APPLICABLE CONTENT IS POSSESSED | WHEN APPLICABLE CONTENT IS NOT POSSESSED |
| SEARCH QUERY ID | 0004 | 0004 |
| CONTENT ID OF APPLICABLE CONTENT | 0212 | BLANK |
| NODE ID OF RESPONSE TRANSMISSION SOURCE NODE | NODE C | BLANK |
| POSSESSION RESONSE NODES LIST (FOR SIMILARITY SEARCH) | NODE D, E, F, G | BLANK |

COMMUNICATION TERMINAL DEVICE, COMPUTER PROGRAM, AND CONTENT SEARCH METHOD

CROSS-REFERENCE TO RELATED APPLICATIONS

This application is based upon and claims the benefit of priority of the prior Japanese Patent Application No. 2010-64018, filed on Mar. 19, 2010, the entire contents of which are incorporated herein by reference.

FIELD

One embodiment relates to a content search method, a communication terminal device, and a computer program executed by the communication terminal device that are used for distributing contents through peer-to-peer (hereinafter, referred to as P2P) communication.

BACKGROUND

A basic method to search a content in a P2P network is "flooding" (bucket-brigade type search). A search query issued by one node that participates in a network is propagated through node to node until the query reaches a node that has the search object content. When the search query reaches a node that possesses the content, a reply indicating the node possesses the content propagates reversely through the incoming route and reaches the node where the search query is issued. The flooding is advantageous in that a search query almost always reaches a node that possesses a content. However, the flooding has disadvantages in that communication traffic for an entire network is large and a response is slow from the perspective of an issue source of the search query.

As a method to suppress traffic, limiting the number of hops is considered. Limiting the number of hops limits a range that a search query propagates. The search discontinues when the number of hops which corresponds to the number of nodes that the search query propagates reaches the limit value.

As a method to expedite a response of a search, a structuring a query propagation form such as an n-ary tree or grouping nodes are considered. However, in the methods, the search queries are propagated in parallel and thus the number of search queries that flow over the P2P network is larger than the number of search queries that propagate in a simple bucket-brigade type search. In other words, the traffic increases.

A distributed hash table (DHT) is used as a routing method in a P2P network. In the DHT, contents possession statuses are aggregated to and maintained by some specific nodes. Accordingly, traffic caused at a search may be substantially reduced compared with that of flooding, and a search with high responsiveness may be achieved.

JP7-334516 discusses a method to increase efficiency of a data search in a computer network that is not a P2P network by referring to a search history. According to the method, in a keyword search in which data that includes a keyword specified by a user is searched, search requests are sequentially transmitted to response sources that transmitted a response similar to the searched keyword in the past search in the order of a response with a higher degree of similarity to the currently searched keyword. The network load may be reduced by constricting destinations to transmit search requests. However, the keyword search results may include a result that is not desired by the user (so-called noise) even if the keyword is included. The noise and the response source are recorded in the search history. Accordingly, the search is conducted by using such search history thereafter.

SUMMARY

According to an aspect of the invention, a communication terminal device includes: a communication unit configured to connect to a network to transmit and receive contents among a plurality of nodes; a memory configured to accumulate a history table that stores a search history of a content search; and a processor configured to execute a process comprising: storing the search history of the content search in the history table; comparing metadata attached to a search object content that is a content search object with metadata attached to a content stored in the history table; determining whether the content stored in the history table is similar to the search object content based on the comparing of the metadata; and making the transmission unit transmit information inquiring about possession of the search object content to a node that possesses a content determined to be similar to the search object content.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a data configuration of a metadata table;
FIG. 4 illustrates a data configuration of a history table;
FIG. 5 illustrates a data configuration of a search query;
FIG. 6 illustrates a data configuration of a search response.

DESCRIPTION OF EMBODIMENTS

In order to distribute contents over a P2P network smoothly; an excessive traffic increase caused by a content search is desired to be substantially suppressed. Limiting the number of hops is effective to substantially suppress the traffic. However, a search query does not reach a node in an area that is outside of the number of hops if the number of hops is limited. Accordingly, the content may not be retrieved even if there is the content in the P2P network. Using a method to aggregate contents possession statuses beforehand such as a distributed hash table causes large traffic when contents possession statuses are aggregated to prepare for a search. The method increases traffic other than the traffic that causes at the search, and accordingly it is generally difficult to substantially suppress traffic caused by the search as a whole. Thus, one embodiment achieves a content search that is better than flooding in terms of substantially suppressing traffic.

A communication terminal device connected as a node to a network that transmits and receives contents among a plurality of nodes includes an accumulation management unit, a similarity determination unit, and a search unit. The accumulation management unit stores a search history in a memory when the communication terminal device conducts a content search. The similarity determination unit determines whether a desired content that is a content search object is similar to a content searched in the past indicated in the search history based on metadata of the two contents. The search unit inquires a node that possesses a content determined to be similar to the desired content among nodes that possess contents searched in the past indicated in the search history about whether the node possesses the desired content.

A communication terminal device according to another aspect of the embodiment includes a search response unit in addition to the above described components. When another node inquires the communication terminal device whether the own node has a content and if the communication terminal device has the inquired content, the search response unit transmits a response indicating that the own node has the inquired content together with information related to the inquired content among the search history.

Search efficiency is improved by constricting inquiry destination nodes to the nodes that at least once posses a content that is similar to the desired content. As a result, the number of wasted inquiries is reduced compared with that of the flooding, and thereby the traffic is reduced.

Figure 1:
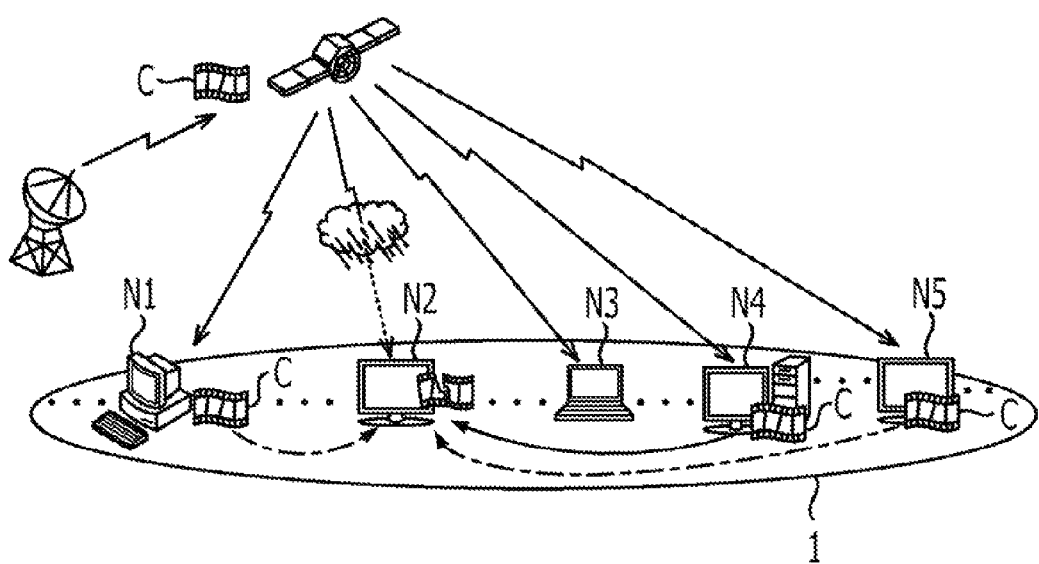
FIG. 1 illustrates an overview of a network.

As one example of the embodiment, a network for a download broadcast service that distributes contents to user substantially the same time will be described. The network 1 illustrated in FIG. 1 is a P2P network in which a plurality of nodes N1, N2, N3, N4, and N5 transmits and receives data among each other. Other than the illustrated nodes N1 to N5, many nodes participate in the network 1. The nodes N1 to N5 are interconnected, for example, through the Internet. In the network 1, a broadcast program that is a content C is distributed as data broadcast to the nodes N1 to N5 by using a satellite. Each of the nodes N1 to N5 has a function as a receiver to acquire a content by receiving a satellite broadcast and a function as a communication terminal device to acquire a content from another node by searching the content over the network. For example, various information devices such as a personal computer or a Personal Digital Assistant (PDA) that includes a receiver for satellite broadcast or a personal computer or PDA that are connected to the receiver, and a television receiver and other multimedia devices that may be connected to a network are used as nodes.

A user of a download broadcast service, in other words, users of devices that are connected to the network 1 as nodes N1 to N5 may view the content C as needed that is accumulated in a device that the user uses. In the network 1, each user may transfer the content C from another user's device to own device if there is any missing data due to unstable reception, for example, a weather condition or an environmental condition. In FIG. 1, the three nodes N1, N4, and N5 posses the content C and the content C is transferred from the node N4 to the node N2. Moreover, each user may acquire the content C from another user's device even if the user does not operate the own device and does not receive the content C at the time of broadcasting. The user may view the content C if the content C is accumulated in the network 1 after the broadcasting even if the user does not know or forget that the program is broadcasted.

As described above, in the network 1, contents are distributed through communications among nodes. Thus a server is not necessarily required that responds to a request to complement a content when there is any missing data. If a request to complement the missing data is addressed by a client and server system, a server with sufficiently high processing capability and a communication infrastructure with high capacity are required. This is because the satellite broadcast is for a wide area and weather may cause unstable reception in many nodes and thereby requests for complementing missing data could concentrate on substantially the same time. Scalability of the network 1 is enhanced by providing each of the nodes N1 to N5 with a function to distribute contents.

A download broadcast service has characteristics that are advantageous in distributing P2P format contents. First, contents are broadcasted almost simultaneously according to a broadcast schedule. Hence, compared with a network with substantially the same size that distributes a content separately as needed, a probability that many nodes have the same content is higher. Particularly, during an early period after the broadcasting, many nodes retain the content without deleting, and the content may be easily found by the content search. Secondly, a survey on viewing programs reveals that a user who uses a certain content tends to use a content that is similar to the content as well. In other words, a probability that a desired content is found is high in a content search that preferentially inquires nodes that have a content similar to the inquired content. Thirdly, metadata is generally provided to a broadcasted content and the metadata may be acquired from an electronic program table generated based on information from a broadcast station. The metadata here is information unique to a content such as a title, a synopsis, and casts and these are the information that the user refers to determine viewing or not viewing the program. An efficient content search may be achieved by determining similarities of contents based on metadata and by preferentially inquiring to nodes of other users with similar preferences as the user.

A configuration and an operation that achieve functions relating to distributing broadcasted contents of a communication terminal device connected to the network 1 as one node will be described. Hereinafter, a node corresponds to the communication terminal device may be called "own node", whereas a node other than the own node may be called "another node" to distinguish the two nodes.

Figure 2:
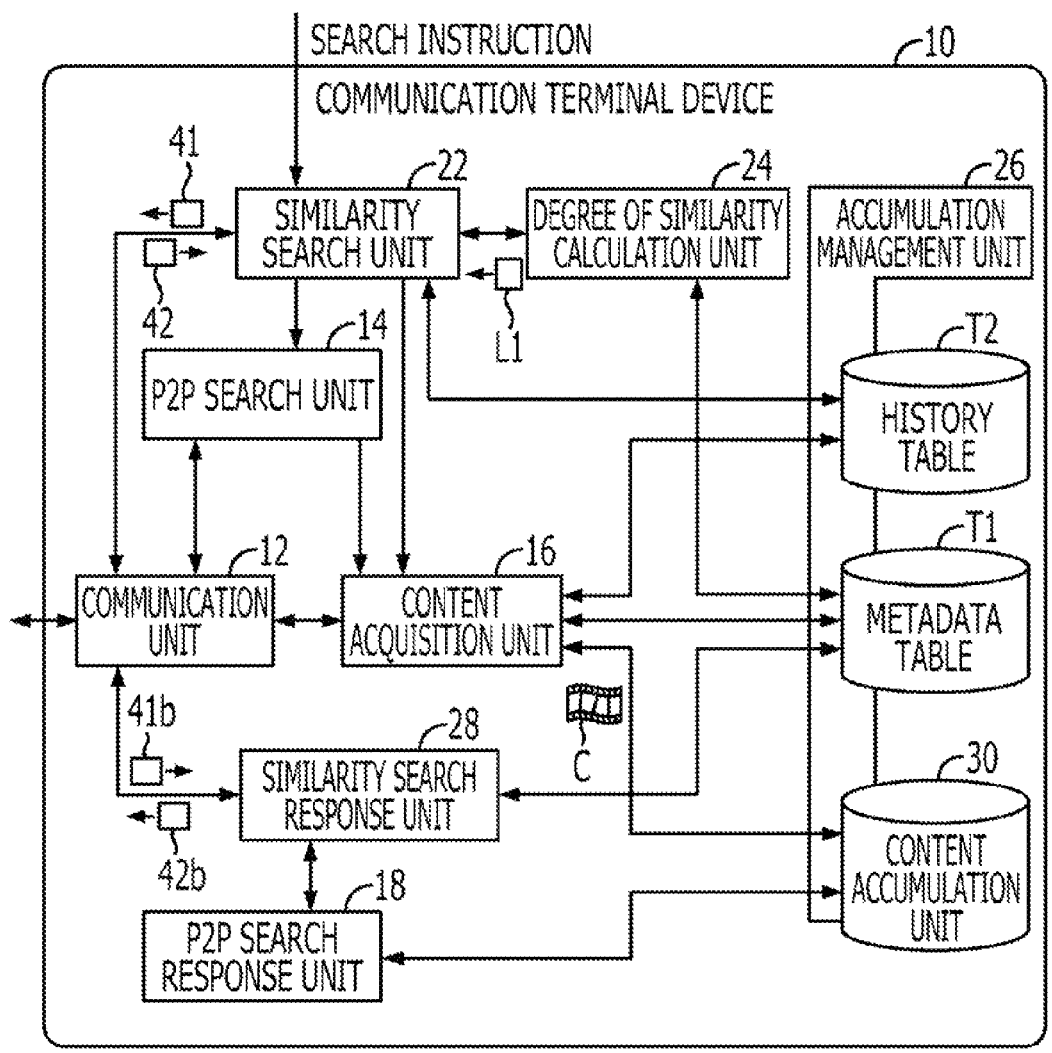
FIG. 2 illustrates a configuration of a communication terminal device.

A communication terminal device 10 illustrated in FIG. 2 includes a communication unit 12, a P2P search unit 14, a content acquisition unit 16, and a P2P search response unit 18 as software components for a general content search that does not use metadata. Moreover, the communication terminal device 10 includes a similarity search unit 22, a degree of similarity calculation unit 24, an accumulation management unit 26 and a similarity search response unit 28 as software components for a content search called "similarity search" that uses metadata. Functions of these components are achieved by executing computer programs by a certain hardware component that is not illustrated.

The communication unit 12 transmits and receives search queries and response messages to and from other communication terminal devices that are other nodes in the network 1. For example, the communication unit 12 transmits a search query 41 issued by the similarity search unit 22 to another node and delivers a response message 42 to the search query 41 from the other node to the similarity search unit 22. Furthermore, the communication unit 12 receives a search query 41b from another node and delivers the search query 41b to the similarity search response unit 28 and transmits a response message 42b from the similarity search response unit 28 to the other node.

The P2P search unit 14 conducts a content search (called "existing P2P search" for convenience) by using a method in which a search query is propagated according to a routing rule such as in flooding. A search query issued by the P2P search unit 14 is transmitted to another node through the communication unit 12 and is propagated through node to node until the search query reaches a node that has the desired content (search object). However, if the number of hops is limited, a search range in which a search query propagates is limited to a portion of the network 1.

The content acquisition unit 16 receives an acquisition instruction from the P2P search unit 14 or the similarity search unit 22, and requests another node to transfer a content that is specified by the instruction. The transfer request is transmitted to the other node through the communication unit 12. When the content acquisition unit 16 receives the content transferred from the other node from the communication unit 12, the content acquisition unit 16 stores the content in a content accumulation unit 30 in a certain memory.

The P2P search response unit 18 responds to a search query of the existing P2P search from another node. According to the embodiment, because the similarity search response unit 28 is a unit for responding to another node, the search query of the existing P2P search that the communication unit 12 receives reaches the P2P search response unit 18 through the similarity search response unit 28. The P2P search response unit 18 checks whether the content indicated by the search query is accumulated in the content accumulation unit 30 and transmits a response message indicating the result to the transmission source of the search query.

The similarity search unit 22 conducts a similarity search that characterizes contents distribution in the network 1 according to the embodiment in response to a search instruction from an instruction unit that is not illustrated. The search instruction that is input to the similarity search unit 22 includes a similarity search instruction and an existing P2P search instruction. When the similarity search unit 22 receives the existing P2P search instruction, the similarity search unit 22 does not conduct any process and delivers the existing P2P search instruction to the P2P search unit 14. When a user of a device that is an own node conducts a certain operation by using a user interface that is not illustrated, a similarity search instruction is provided to the similarity search unit 22 by an instruction unit that accepts the operation. Alternatively, when an automatic search mode is set and a reception monitor unit that monitors a broadcast reception status detects missing data, an instruction unit that receives a notification from the reception monitor unit provides a similarity search instruction to the similarity search unit 22. Hereinafter, a "desired content" indicates a search object content indicated by a search instruction in an own node.

The similarity search unit 22 issues a search query 41 inquiring possession of a desired content when the similarity search unit 22 receives a similarity search instruction. A destination of the search query 41 in the similarity search is selected based on a desired content that is different from the existing P2P search in that a destination of a search query is selected based on a routing. The similarity search unit 22 identifies a content that is similar to the desired content by collaborating with the degree of similarity calculation unit 24 and determines another node that possesses or possessed in the past a content similar to the desired content as a destination of the search query 41.

When the other node returns a response message 42 indicating the other node possesses the desired content, in other words, the desired content is found, the similarity search unit 22 requests the content acquisition unit 16 to acquire the desired content. In response to the request, the content acquisition unit 16 acquires the desired content and stores the acquired desired content in the content accumulation unit 30.

The degree of similarity calculation unit 24 calculates a degree of similarity that indicates how much contents that are searched in the past and recorded in a history table T2 are similar to the desired content based on metadata recorded in a metadata table T1. For example, a degree of similarity is indicated by values from 0 to 1. The degree of similarity calculation unit 24 determines a content with substantially the largest calculated degree of similarity or with a degree of similarity that is a threshold or more as a content similar to the desired content (hereinafter called a similar content). The destination of the search query 41 is defined as described above based on the determination result.

A known technology that compares contents of each item of metadata or words included in metadata may be used for calculating a degree of similarity by the degree of similarity calculation unit 24. For example, methods (JP4182743, JP2008-141416) may be applied that extract a recommended program estimated to match with a user's preference from programs to be broadcasted by using metadata provided by an Electronic Program Guide (EPG).

The accumulation management unit 26 records certain data relating to a search or an acquisition in the history table T2 when a content search by the P2P search unit 18 or the similarity search unit 22, and an acquisition of a desired content by the content acquisition unit 16 are conducted. The history table T2 is history information about content search and acquisition and stored in a nonvolatile memory. According to the embodiment, the accumulation management unit 26 manages the metadata table T1 and the content accumulation unit 30 in addition to manage the history table T2. Note that a management unit that is in charge of managing the components other than the history table T2 may be provided separately.

The similarity search response unit 28 responds to a search query 41b of a similarity search from another node. The similarity search response unit 28 refers to index information of the metadata table T1 or the content accumulation unit 30 in order to check whether the content inquired by the search query 41b is possessed or not. The similarity search response unit 28 transmits a response message 42b that indicates whether the content inquired is possessed or not to a transmission source of the search query 41b.

FIG. 3 illustrates a data configuration of the metadata table T1. The metadata table T1 is a list of metadata for contents acquired by receiving a broadcast program or by a content search. Metadata is managed by being classified into a content identification (ID), a title, and detailed information.

FIG. 4 illustrates a data configuration of the history table T2. The history table T2 indicates possession response nodes and an acquisition source node for the content searched as the desired content. The possession response node is another node that returns a response message indicating that the node possesses the searched content. The acquisition source node is a node that is selected from possession response nodes and provides the content to the own node.

FIG. 5 illustrates a data configuration of a search query 41. The search query 41 includes a search query ID, a content ID of a desired content, a node ID of a search transmission source node (own node), and a similarity search flag as items. The similarity search flag is an identifier for a search method provided to have a common format for the similarity search and the existing P2P search. In the search query 41 of the similarity search, a value of a similarity search flag is a value indicating a similarity search ("YES" in FIG. 5). Meanwhile, in the existing P2P search, a search query with substantially the same configuration as that of the search query 41 except that a value of a similarity search flag is blank is issued.

FIG. 6 illustrates a data configuration of a response message 42. The response message 42 includes a search query ID, a content ID of an applicable content, a node ID of a response transmission source node (own node), and a possession response nodes list as items. The applicable content is the desired content in the search query 41. The possession response nodes list is provided so that a plurality of nodes involved in a search to share the search history each other by utilizing an opportunity of a search. Information written in the possession response nodes list is the possession response node and the acquisition source node correspond to the applicable content in the history table T2.

Values of items other than that for the search query ID are determined based on whether the desired content is possessed or not. If the own node does not posses the applicable content, values of items other than that for the search query ID are blank. If the own node possesses the applicable content, certain values or data are written to each of the items. The format of the response message 42 is common to that of the response message in the existing P2P search. In the P2P search, the possession response nodes list is blank.

Operations of the communication terminal device 10 will be described in detail by referring to FIGS. 7 to 10.

Figure 7:
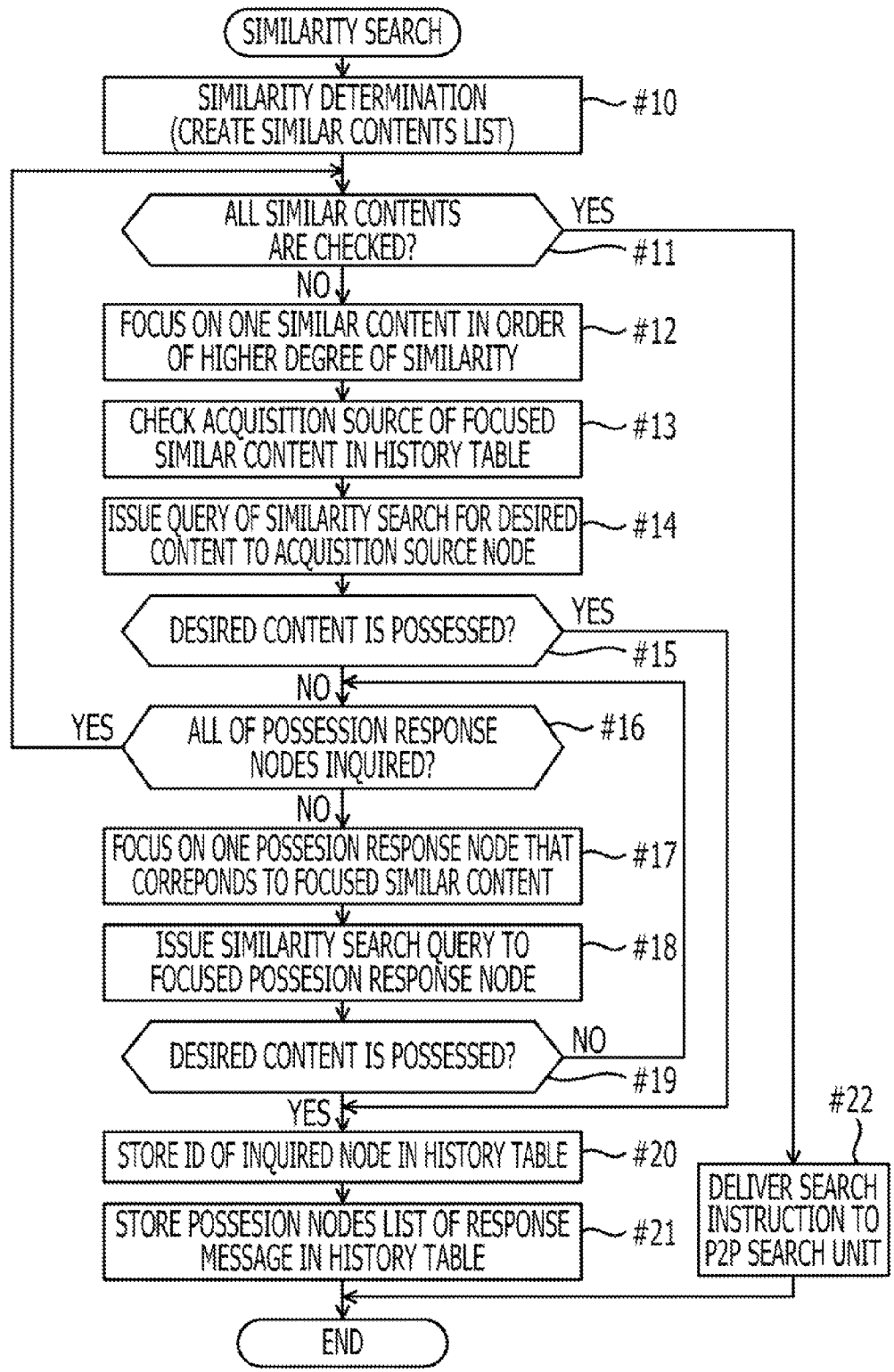
FIG. 7 is a flow chart illustrating a similarity search operation.

FIG. 7 illustrates a flow chart of a similarity search operation. A content search starts in response to a search instruction operation by a user. The user selects a program that the user desires to watch from broadcasted programs as a desired content, for example, by displaying an electronic program table, and makes an instruction to search the desired content. Accordingly, a search instruction that includes a content ID and metadata of the desired content displayed in the electronic program table is provided to the communication terminal device 10. According to the embodiment, it is assumed that a default search method is a similarity search and an automatic acquisition of the desired content is set when the desired content is found by a search.

In FIG. 7, when a similarity search instruction is provided to the similarity search unit 22, the desired content specified in the search instruction is notified from the similarity search unit 22 to the degree of similarity calculation unit 24. The degree of similarity calculation unit 24 executes similarity determination processing (#10). In the similarity determination processing, a similar contents list is created based on metadata as will be described later.

When there is no similar content, or the desired content is not found by a search conducted by focusing on respective similar contents in the similar contents list (Yes at #11), the search instruction is delivered to the P2P search unit 14 (#22). Accordingly, the P2P search unit 14 conducts the search.

The similarity search unit 22 focuses on one similar content with substantially highest degree of similarity other than the content that is already focused on among the similar contents in the similar contents list (#12). The similarity search unit 22 takes in a node ID of an acquisition source node of the focused similar content from the history table T2 (#13), and issues a search query 41 inquiring possession of the desired content to the acquisition source node (#14).

If a response message 42 indicating the acquisition source node of the similar content possesses the desired content (Yes at #15), the search is assumed to be successful. If the search is successful, the accumulation management unit 26 adds the desired content in the history table T2 as the retrieved content and stores a node ID of a node to which the search query 41 is transmitted last at the top of the column of the possession response nodes for the desired content (#20). Moreover, the accumulation management unit 26 stores node IDs of nodes in the possession response nodes list of the response message 42 in a column of possession response nodes in the history table T2 (#21).

Meanwhile, if the acquisition source node of the similar content does not posses the desired content (No at #15), an inquiry is made to possession response nodes instead of the acquisition source node. In other words, the similarity search unit 22 refers to the history table T2 and focuses on one of the possession response nodes for the content searched in the past that is focused on as a similar content (#17). At this time, the possession response node that is the acquisition source node is not focused. The similarity search unit 22 issues a search query 41 inquiring the focused possession response node whether the desired content is possessed or not (#18).

If a response message 42 is received that indicates the possession response node possesses the desired content (Yes at #19), the search is assumed to be successful. In this case, the accumulation management unit 26 records a search history for the desired content in the history table T2 in the same manner as described above (#20 and #21). If the focused possession response node does not posses the desired content (No at #19), the similarity search unit 22 checks whether there is any unfocused possession response node that is associated with the focused content (#16). If there is any unfocused possession response node (no at #16), a search query 41 is transmitted to one of the unfocused possession response nodes (#17 and #18). If the search fails, operations #16 to #19 are repeated. If the search fails, even after all of the possession response nodes are inquired (Yes at #16), the process returns to the operation #11.

As described above, in the similarity search, a desired content is searched by constricting nodes to be inquired to nodes that at least posses the similar content in the past. A probability of the node that possesses a content similar to the desired content in the past posses the desired content is higher than that of another node possesses the desired content. Therefore, the similarity search is efficient. A node that possesses a similar content with a higher degree of similarity is prioritized when a destination of a search query is selected, and the desired content is likely to be found earlier. Moreover, an acquisition source node of the similar content accumulates the similar content in the past and a probability that the acquisition source node accumulates the desired content is relatively high. Inquiring the acquisition source node first increases the probability that the desired content is found earlier.

Figure 8:
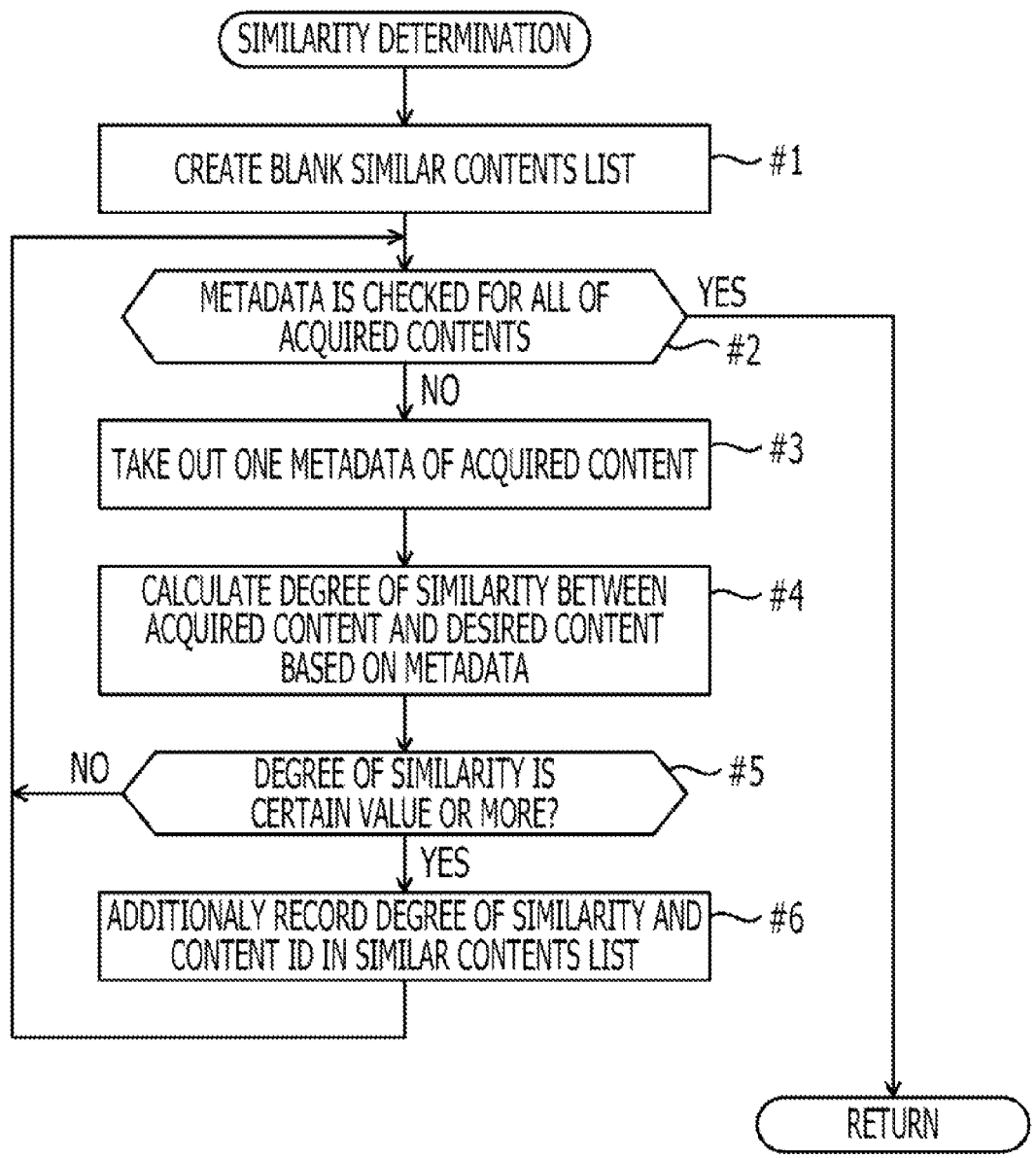
FIG. 8 is a flow chart illustrating similarity determination processing executed by a degree of similarity calculation unit.

FIG. 8 illustrates a flow chart of a similarity determination processing executed by the degree of similarity calculation unit 24. The degree of similarity calculation unit 24 creates a blank similar contents list (#1). The similar contents list is a temporally used table having items of a content ID and a degree of similarity. The degree of similarity calculation unit 24 checks all of the acquired contents recorded in the metadata table T1 to determine whether the acquired content is a similar content. For example, the degree of similarity calculation unit 24 focuses on one of the acquired contents and takes in metadata of the focused acquired content from the metadata table T1 (#3). The degree of similarity calculation unit 24 calculates a degree of similarity based on metadata of the acquired content and metadata of the desired content (#4). As described above, known methods are used for the calculation. The degree of similarity calculation unit 24 checks whether the calculated degree of similarity is a specified certain value or more (#5). The check corresponds to similarity determination. In other words, if the degree of similarity is the certain value or more (Yes at #5), the acquired content is determined to be a similar content. If the degree of similarity is less than the certain value (No at #5), the acquired content is determined not to be a similar content. If the acquired content is a similar content (Yes at #5), the degree of similarity calculation unit 24 writes the degree of similarity of the acquired content and the content ID in the similar contents list (#6). If the acquired content is not a similar content (No at #5), the degree of similarity calculation unit 24 returns to operation #2 to check whether determinations are made for all of the acquired contents. The operations #3 to #6 are repeated until the check at operation #2 becomes Yes.

Figure 9:
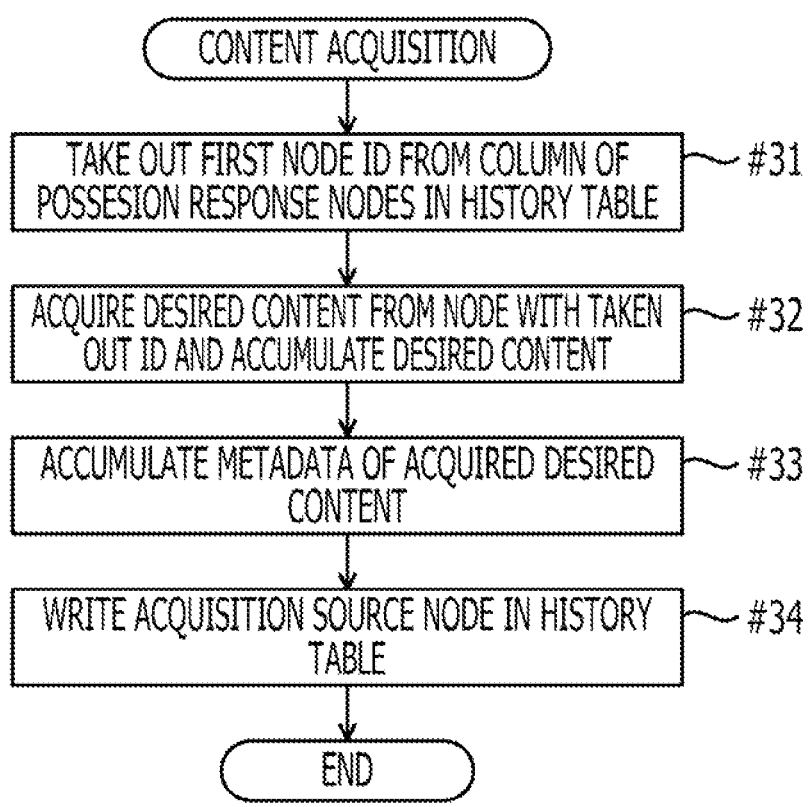
FIG. 9 is a flow chart illustrating a content acquisition operation.

FIG. 9 is a flow chart illustrating a content acquisition operation. When the content acquisition unit 16 receives an acquisition request from the similarity search unit 22 or the P2P search unit 14, the content acquisition unit 16 takes out the first node ID from the column of the possession response nodes in the history table T2 (#31). The content acquisition unit 16 acquires the desired content from a node with the taken out node ID, and accumulates the desired content and the metadata. The desired content is accumulated in the content accumulation unit 30 (#32), and the metadata is written into the metadata table T1 (#33). The accumulation management unit 26 writes the node ID of the acquisition source node of the desired content in the history table T2 (#34). Accordingly, the acquisition history is recorded.

Figure 10:
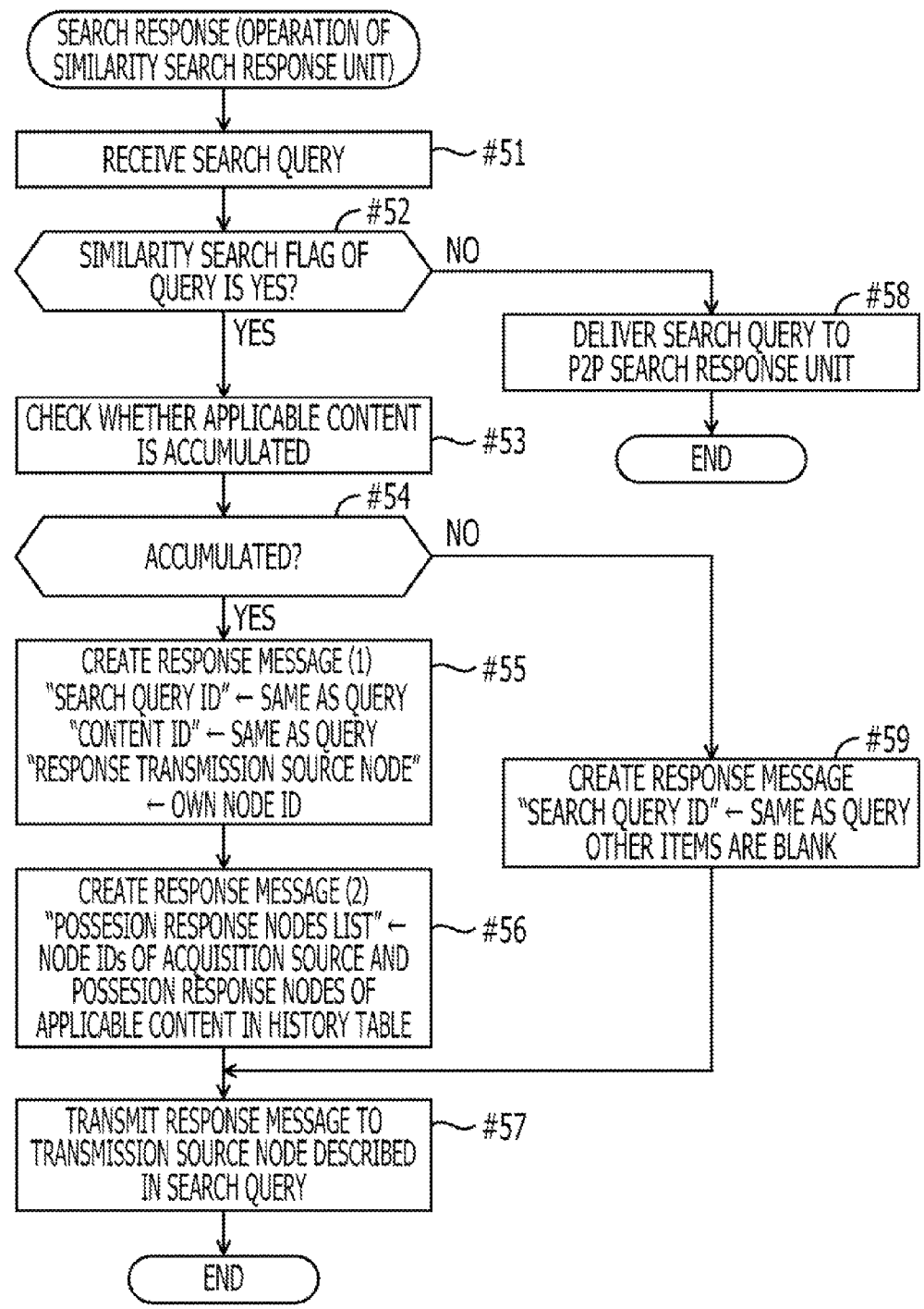
FIG. 10 is a flow chart illustrating a response operation for a search query from another node.

FIG. 10 is a flow chart illustrating a response operation for a search query from another node. When the similarity search response unit 28 receives a search query 41b issued by the other node from the communication unit 12 (#51), the similarity search response unit 28 checks a similarity search flag (#52). If a value of the similarity search flag is not "YES" that indicates a similarity search, the similarity search response unit 28 delivers the search query to the P2P search response unit 18 (#58). In this case, a response is made by the P2P search response unit 18. When the response by the P2P search response unit 18 indicates that the inquired content does not exist, the response is not transmitted to the transmission source of the search query but the search query is transferred to a certain node according to the routing.

When the similarity search flag indicates a similarity search (YES at #52), the similarity search response unit 28 checks for accumulation (possession) of the inquired content (#53), and creates the following response message 42b according to the result (#54).

When a content that corresponds to the inquiry is accumulated (Yes at #54), an ID of the search query 41b from the other node is stored in the column of the "search query ID" of the response message 42b, and an ID of the inquired content is stored in the column of the "content ID." A node ID of the own node is stored in the column of the "node ID of response transmission source node" (#55). Moreover, the acquisition source node of the applicable content, and a node ID of the possession response nodes in the history table T2 are stored in the column of the "possession response nodes list" of the response message 42b (#56). Meanwhile, if the inquired content is not accumulated (NO at #54), the response message 42b in which an ID of the search query 41b from the other node is stored in the column of the "search query ID", and columns other than the "search query ID" are blank is created.

The similarity search response unit 28 transmits the created response message 42b to the transmission source node (issue source of the search query) indicated by the search query 41b (#57).

Figure 11:
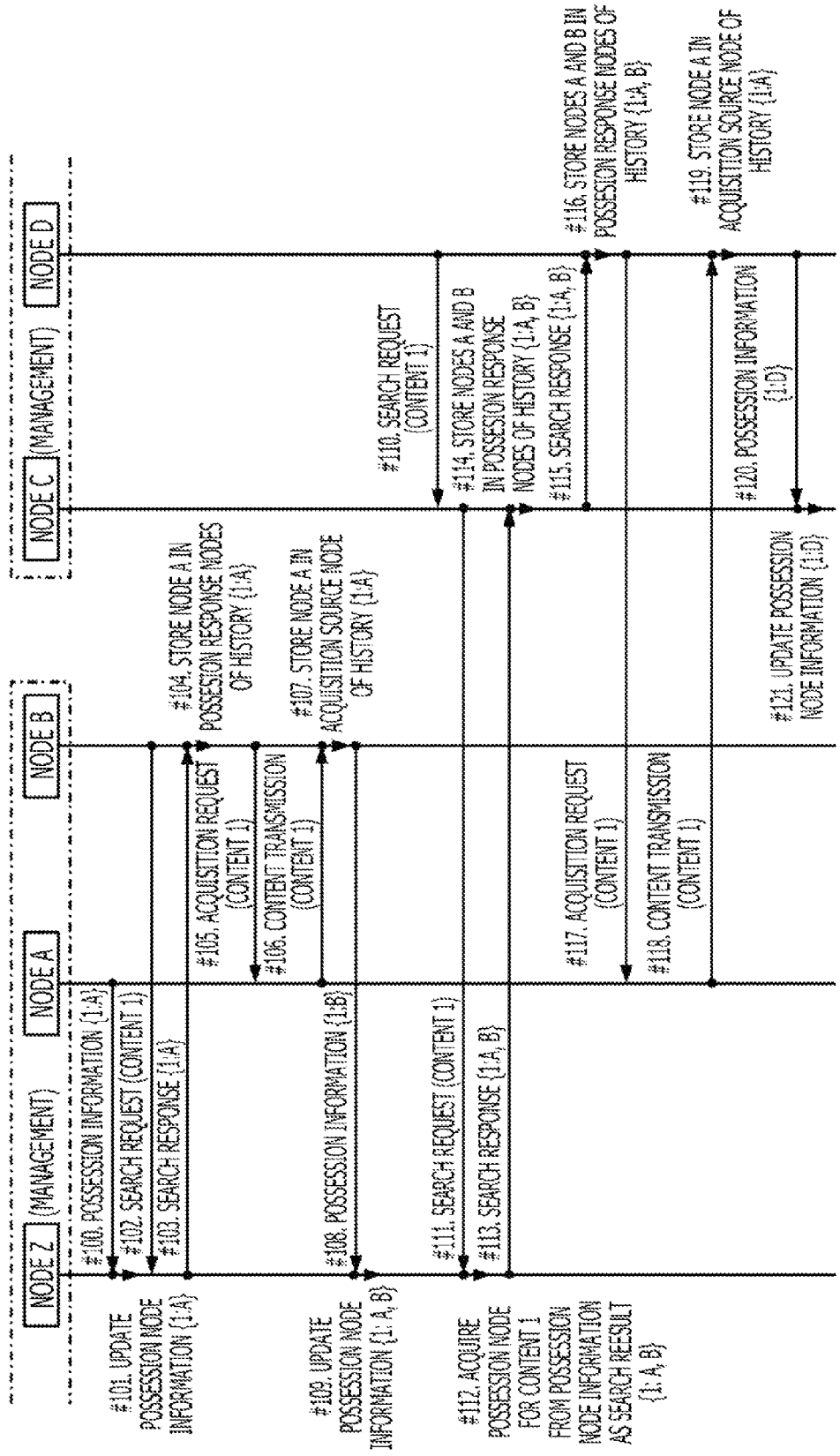
FIG. 11 illustrates a first example of an operation of a plurality of nodes involved in distribution of contents.
Figure 12:
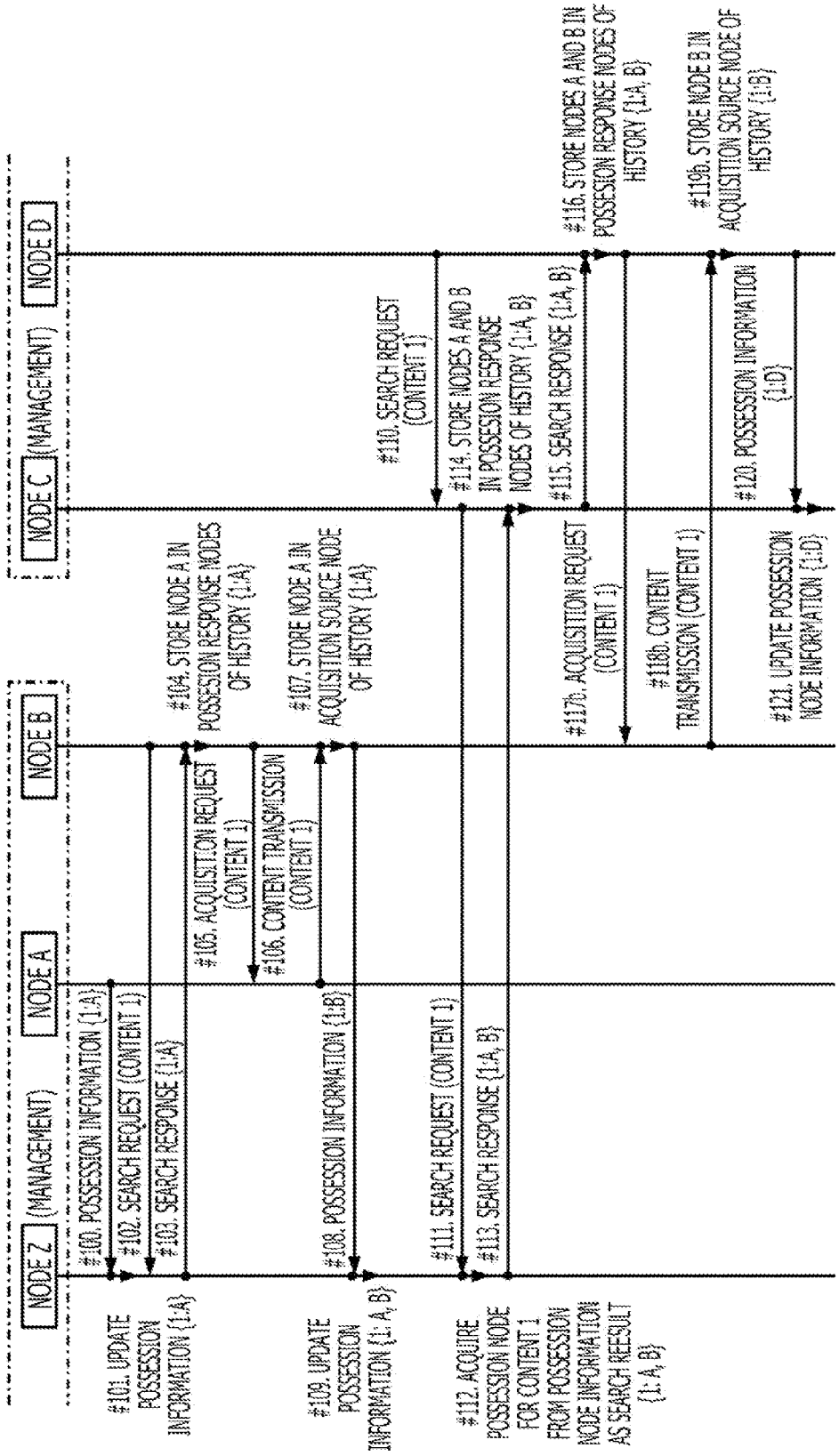
FIG. 12 illustrates a second example of an operation of a plurality of nodes involved in distribution of contents.

FIGS. 11 and 12 illustrate examples of operations of a plurality of nodes involved in distribution of contents. In the examples, a content "1" is distributed among five nodes, A, B, C, D, and Z. The nodes are grouped to streamline the existing P2P search and a node that functions as a management node is defined for each group. The nodes A, B, and Z belong to one group and the node Z functions as the management node. Moreover, the nodes C and D belong to another group and the node C functions as the management node. Content possession information in each of the nodes including the management node itself in the group is aggregated in the management node. Here, it is assumed that only the node A possesses the content "1" at the beginning.

In FIG. 11, the node A notifies the node Z that functions as the management node that the node A possesses the content "1" (#100). The node Z additionally records that the node A possesses the content "1" in possession node information that the node Z manages (#101). For example, the node B conducts the existing P2P search for the content "1." In the existing P2P search, a search is requested (issues a search query) to the management node (#102). The node Z that receives the search request transmits a response indicating that the node A possesses the content "1" to the node B (#103). The node B stores a node ID of the node A in the column of the possession response nodes in the own history table T2 (#104) and requests the node A to transfer the content "1" to acquire the content "1" (#105). The node A that receives the request transmits the content "1" to the node B (#106). The node B that receives the content "1" stores the node ID of the node A in the column of the acquisition source node in the own history table T2 (#107). The node B notifies the node Z that the node B possesses the content "1" (#108). The node Z updates the possession node information so as to indicate that the nodes A and B posses the content "1" (#109).

For example, the node D conducts the existing P2P search for the content "1" (#110). At this time, the node C as the management node does not have possession node information for the content "1." The node C that receives the search request transfers the search request to the node Z in the other group that is defined in the routing because the group to which the node C belongs does not have the content "1" (#111). The node Z extracts data for the content "1" from the possession node information (#112) and transmits a response indicating the nodes A and B posses the content "1" to the node C (#113). The node C stores node IDs of the node A and the node B in the column of the possession response nodes in the own history table T2 (#114) and notifies the contents of the response obtained from the node C to the node D that is the search request source (#115). The node D stores node IDs of the nodes A and B in the column of the possession response nodes of the own history table T2 (#116) and requests, for example, the node A to transmit the content "1" to acquire the content "1" (#117). The node A that receives the request transmits the content "1" to the node D (#118). The node D that receives the content "1" stores the node ID of the node A in the column of the acquisition source node in the own history table T2 (#119) and notifies the node C that the node D possesses the content "1" (#120). The node C updates the possession node information so as to indicate that the node D possesses the content "1" (#121).

In FIG. 12, operations of #100 to #116 are substantially the same as those in the example of FIG. 11. The node D requests the node B to transfer the content "1" to acquire the content "1" (#117b) when the existing P2P search of the operations #110 to #115 reveals that the nodes A and B possess the content "1." The node B that receives the request transmits the content "1" to the node D (#118). The node D that acquires the content "1" stores the node ID of the node B in the column of the acquisition source node in the own history table T2 (#119b), and notifies the node C that the node D possesses the content "1" (#120). The node C updates the possession node information so as to indicate that the node D possesses the content "1" (#121).

As described above, the column of the possession response nodes in the history table of each node is updated every time each node conducts the existing P2P search, and the column of the acquisition source node is updated every time a content is acquired from another node. In other words, each node accumulates information that is substantially the same as that the management node has regarding possession status indicating which node possesses a content when each node conducts the existing P2P search. Information regarding the possession status accumulated in the existing P2P search is used to select a destination of a search query in the similarity search.

Figure 13:
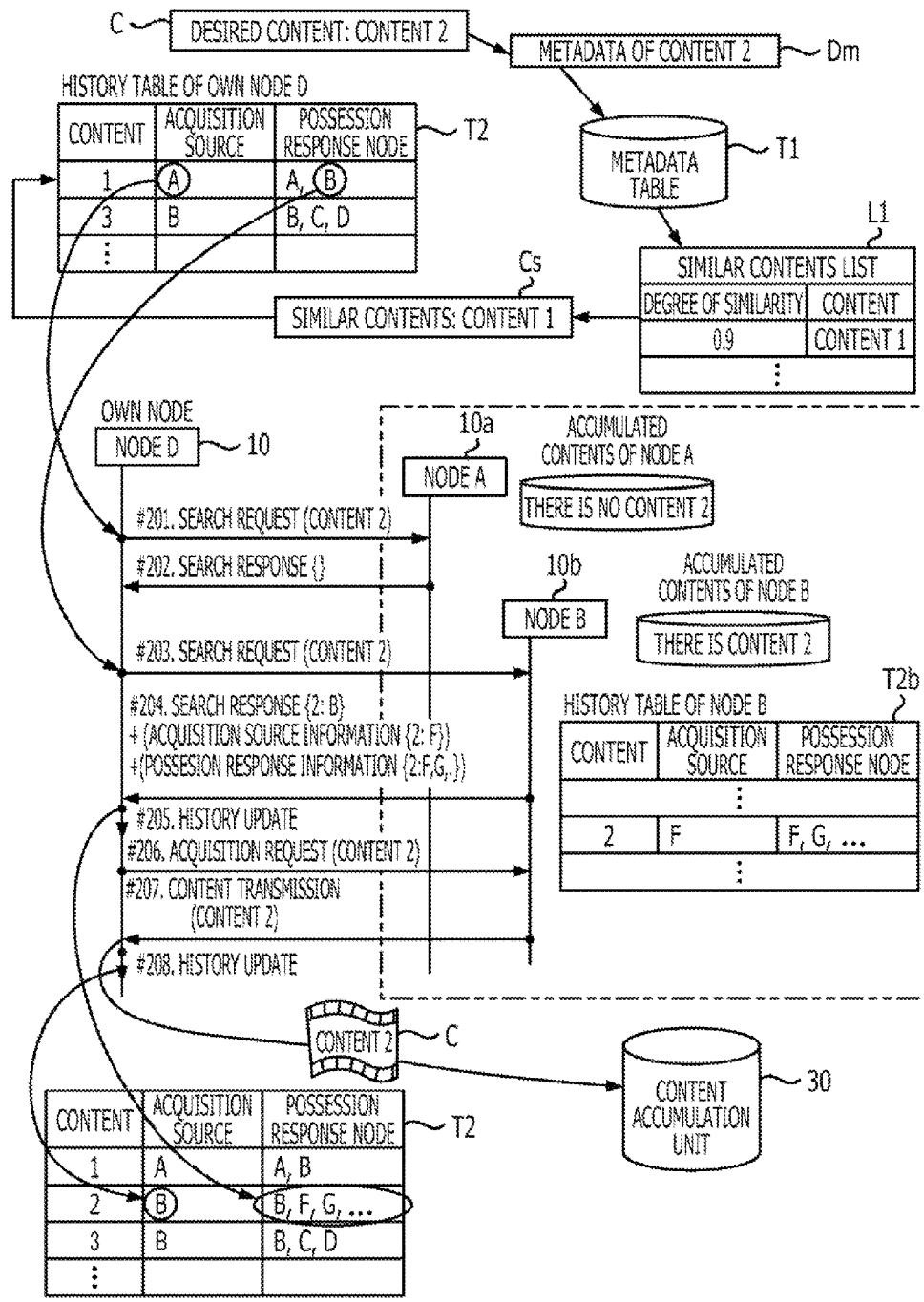
FIG. 13 is an example of content acquisition by a similarity search.

FIG. 13 is an example of a content acquisition by a similarity search. In the illustrated example, the three nodes, A, B, and D involve in acquiring a content "2" that is a desired content C. The node D is an own node and nodes A and B that are other nodes correspond to the communication terminal devices 10a and 10b. The configurations of the communication terminal devices 10a and 10b are substantially the same as that of the above-described communication terminal device 10 that is the own node.

A case is assumed in which the own node D does not possess the content "2", and a search request to search the content "2" is provided to the communication terminal device 10. The search request includes metadata Dm of the desired content C (in this example, metadata of the content "2") or the inquiry destination.

As described above, the degree of similarity calculation unit 24 creates similar contents list L1 based on the metadata Dm of the desired content C and metadata of the acquired content in the metadata table T1. The illustrated similar contents list L1 includes the content "1" as the similar content Cs. For the content "1", the history table T2 records the node A as the acquisition source and the nodes A and B as the possession response nodes.

The own node D (communication terminal device 10) requests the other node A that is the acquisition source node of the similar content Cs (the content "1") to search the desired content C (the content "2") (#201). In other words, the own node D issues a query (search query 41) that inquires possession of the content "2" to the other node A. According to the embodiment, the other node A does not possess the content "2", and thereby a substantially blank response message 42 indicating the node A does not possess the content "2" is transmitted from the other node A to the own node D (#202). Accordingly, the own node D requests another node B that is recorded as the possession response node to search the desired content 2 (#203). The other node B is assumed to possess the content "2."

The other node B transmits a response message 42 indicating that the other node B possesses the content "2" to the own node D (#204). The response message 42 in this case includes information of the content "2" (node IDs that indicate the acquisition source node and the possession response nodes) extracted from the history table T2 of the other node B. The own node D that receives the response message 42 records the node B that is the response transmission source node and the nodes F, G, . . . described in the possession response nodes list in the response message 42 in the column of the possession response nodes of the history table T2 (#205).

The own node D requests, for example, the node B to transfer the content "2" to acquire the content "2" (#206). The node B that receives the request transmits the content "2" to the node D (#207). The node D that receives the content "2" stores the content "2" in the content accumulation unit 30 and stores the node ID of the node B in the column of the acquisition source node of the own history table T2 (#208).

Figure 14:
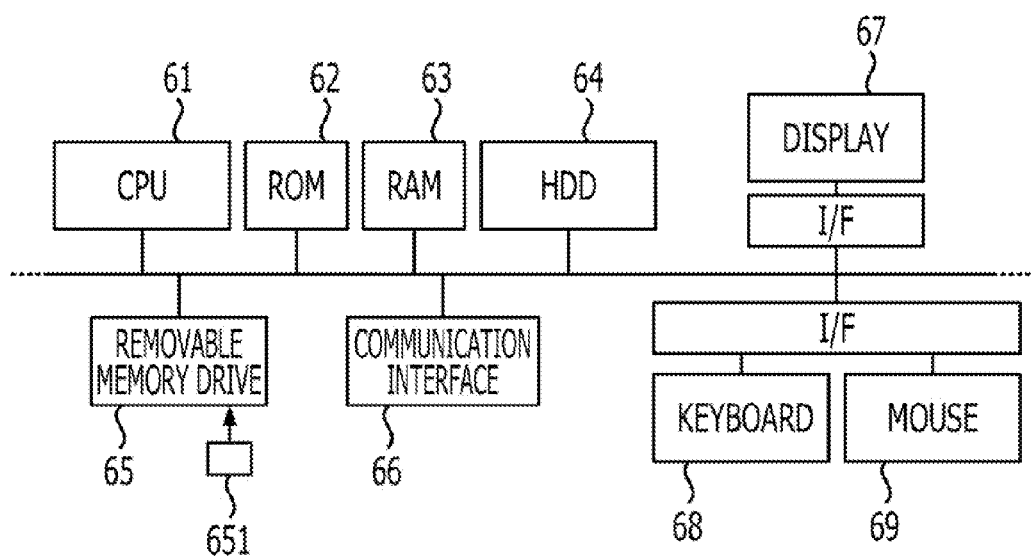
FIG. 14 is an example of a hardware configuration of a communication terminal device.

The communication terminal device 10 that conducts a similarity search in which the search object nodes are constricted by using metadata as described above may be achieved by a personal computer, for example, with a general hardware configuration as illustrated in FIG. 14. The personal computer includes a central processing unit (CPU) 61 that executes various programs, a Read Only Memory (ROM) 62 that stores a control program, and a Random Access Memory (RAM) 63 that functions as a work area. A hard disk drive 64 as a storage is used for accumulating data. A removable media drive 65 to access a Compact Disc Read Only Memory (CD-ROM) and a Digital Versatile Disk (DVD), and a communication interface 66 to connect a network are also components of the personal computer. A computer program to achieve functions of the communication terminal device 10 may be installed to the storage 64 from the removable storage media 65 in which the computer program is stored or from an external device that is connected to the communication terminal device 10 through the communication interface 66. The personal computer includes a display 67, a keyboard 68, and a mouse 69 as human interface devices. A remote controller that uses infrared rays or other signal media may be used as a human interface device. A remote controller may be provided instead of the keyboard 68 and the mouse 69 when the communication terminal device 10 is incorporated in a television receiver.

In the above-described embodiment, the number of similar contents in the similar contents list that is created by the degree of similarity calculation unit 24 for one desired content C may be set as needed. The degree of similarity may be classified into ranks and an upper limit of the number of similar contents may be determined for each rank. An upper limit for the total number of the acquisition source node and the possession response nodes that become the destination of the search query 41 may be defined. The degree of similarity is not necessarily calculated for all of the acquired contents. The determination of the degree of similarity may be discontinued and the similarity search may be started when the number of the similar contents presented in the list reaches a certain number. An algorithm to calculate the degree of similarity and a threshold to determine whether the content is similar or not may be optimized as needed.

A content distributed in the network 1 may be an entire broadcast program or blocks that is obtained by dividing one program. Data to which an ID is assigned and that may be uniquely identified may be a search object (a desired content).

A primary acquisition form of a content in each node of the network 1 may not be limited to receiving a broadcasted program but may be downloading data through data communication or reading data from a storage medium.

The program described in the embodiment is stored in and distributed through a computer-readable storage medium. The computer-readable storage medium includes a non-volatile storage medium, for example, a flexible disk, a hard disk, a Compact Disc Read Only Memory (CD-ROM), DVD-Read Only Memory (DVD-ROM), DVD-Random Access Memory (DVD-RAM), a Blue-ray Disk (BD), a USB memory, and a flash memory. The computer program may be transmitted through digital communication that uses a broadcast wave, an electric telecommunication line, wireless or wired communication lines, and a network such as the Internet. Note that the computer-readable storage medium does not include propagation signals in which the computer program is embedded. Even if a computer program is transmitted by being embedded in the propagation signals, there is a computer-readable storage medium in a computer that is a transmission source of the program. Accordingly, the computer-readable storage medium is a physical storage medium. The broadcast wave may be transmitted by using a ground wave, a satellite broadcasting wave, or a transmission network for a cable television. The cable television may modulate a carrier wave into light and use an optical fiber as a transmission medium. As described above, regardless of a form of a transmission medium of the carrier wave, the computer-readable storage medium is a physical storage medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication terminal device that is coupled to a network including a plurality of nodes, the device comprising:
   a memory configured to accumulate a history table that stores a search history of a content search; and
   a processor configured to execute a process comprising:
   storing the search history of the content search in the history table;
   comparing metadata attached to a search object content that is a content search object with metadata attached to a content stored in the history table;
   determining whether the content stored in the history table is similar to the search object content based on the comparing of the metadata;
   wherein the processor executes the process further comprising:
   receiving information inquiring about possession of a content from another node;
   searching the history table for history information related to the inquired about content when the inquired about content is possessed; and
   transmitting a response indicating that the inquired about content is possessed and the retrieved history information to the another node;
   transmitting information inquiring about possession of the search object content to a node that possesses a content determined to be similar to the search object content;
   receiving response information for the information inquiring about possession of the search object content; and
   storing history information included in the response information in the history table when the response information includes the history information related to the search object content, the history information being accumulated in a content search by an inquiry destination node.

2. The communication terminal device according to claim 1, wherein the processor executes the process to include whether history information related to the search object content that the inquiry destination node possesses judges to be transmitted in information inquiring about possession of the search object content.

3. The communication terminal device according to claim 1, wherein
   the memory accumulates a metadata table that stores metadata attached to a content,
   the processor executes the process further comprising:
   searching the metadata table for metadata attached to the search object content, and searching the metadata table for metadata attached to the content stored in the history table.

4. The communication terminal device according to claim 3, wherein the processor executes the process further comprising:
   conducting a content search based on a content ID that identifies the search object content;
   storing the retrieved content ID in the history table; and
   retrieving the metadata from the metadata table based on the content ID.

5. The communication terminal device according to claim 1, wherein the memory is one of a semiconductor memory and a hard disk.

6. A non-transitory storage medium configured to store a program executed by a communication terminal device that is connected to a network to transmit and receive contents among a plurality of nodes, the program causing the communication terminal device to execute a process of:
   storing a search history of a content search in a memory;
   comparing metadata attached to a search object content that is a content search object with metadata attached to a content stored in the search history;
   determining whether the content stored in the search history is similar to the content search object based on the comparing of the metadata;
   wherein the processor executes the process further comprising:
   receiving information inquiring about possession of a content from another node;
   searching the history table for history information related to the inquired about content when the inquired about content is possessed; and
   transmitting a response indicating that the inquired about content is possessed and the retrieved history information to the another node;
   transmitting information inquiring about possession of the search object content to a node that possesses a content determined to be similar to the search object content;
   receiving response information for the information inquiring about possession of the search object content; and
   storing history information included in the response information in the history table when the response information includes the history information related to the search object content, the history information being accumulated in a content search by an inquiry destination node.

7. A content search method causing a computer connected to a network to transmit and receive contents among a plurality of nodes, the method comprising:
   accumulating, by each of the plurality of nodes, history of a content search conducted by the respective nodes;
   comparing metadata attached to a search object content that is a search object with metadata attached to a content included in an accumulated history when each of the plurality of the nodes conducts a content search;

determining whether the content included in the history is similar to the search object content based on the comparing of the metadata;

wherein the processor executes the process further comprising:

receiving information inquiring about possession of a content from another node;

searching the history table for history information related to the inquired about content when the inquired about content is possessed; and transmitting a response indicating that the inquired about content is possessed and the retrieved history information to the another node;

transmitting information inquiring about possession of the search object content to a node that possesses a content determined to be similar to the search content objects;

receiving response information for the information inquiring about possession of the search object content; and storing history information included in the response information in the history table when the response information includes the history information related to the search object content, the history information being accumulated in a content search by an inquiry destination node.

* * * * *